(12) United States Patent
Kramer et al.

(10) Patent No.: US 6,812,663 B2
(45) Date of Patent: Nov. 2, 2004

(54) ELECTRIC DRIVE SYSTEM INCLUDING A STEPPER MOTOR

(75) Inventors: Dennis A. Kramer, Troy, MI (US);
Dale K. Bell, Ortonville, MI (US);
Clive Harrup, Bromham (GB);
Mehmet S. Ciray, Glenwood, IN (US);
Silvio M. Yamada, Waterford, MI (US);
Dean M. House, Pataskala, OH (US);
David K. Platner, Shelby, MI (US);
Dale J. Eschenburg, Clinton Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/397,449

(22) Filed: Mar. 26, 2003

(65) Prior Publication Data

US 2004/0189235 A1 Sep. 30, 2004

(51) Int. Cl.$^7$ .................................................. H02K 7/10
(52) U.S. Cl. ........................ 318/368; 318/380; 318/280; 318/696; 318/685
(58) Field of Search ................................. 318/368, 380, 318/379, 280, 696, 685, 757, 759, 362, 375, 376, 377; 701/41; 310/42; 180/443, 333

(56) References Cited

U.S. PATENT DOCUMENTS

| | | | |
|---|---|---|---|
| 4,510,680 A | * 4/1985 | Miller et al. ................... 29/598 |
| 5,789,896 A | 8/1998 | Fischer et al. |
| 6,078,156 A | * 6/2000 | Spurr ........................ 318/368 |
| 6,081,042 A | 6/2000 | Tabata et al. |
| 6,205,379 B1 | 3/2001 | Morisawa et al. |
| 6,288,508 B1 | 9/2001 | Taketomi et al. |
| 6,301,534 B1 | * 10/2001 | McDermott et al. .......... 701/41 |
| 2002/0127324 A1 | * 9/2002 | Maza et al. ................. 426/605 |

OTHER PUBLICATIONS

Article entitled, "Motor Technologies," pp. A4–A12, A22–A28; "Engineering Reference," pp. A55–A56; "Glossary of Terms," pp. A68–A70.

Article entitled, "Working with Stepper Motors," 10 pages.

* cited by examiner

*Primary Examiner*—Karen Masih
(74) *Attorney, Agent, or Firm*—Carlson, Gaskey & Olds

(57) ABSTRACT

A vehicle drive assembly includes an electric motor directly coupled to a rotatable member for driving a wheel, for example, without gear reduction assemblies between the motor output and the driven wheels. A multi-phase, high pulse current stepper motor is used as the motor in one example. A driven wheel is supported by a wheel mounting member in a conventional fashion. A rotatable member associated with the wheel mounting member is directly coupled to an output of the stepper motor. The stepper motor can selectively operate in several modes. A first mode provides driving torque to the vehicle wheels, a second mode provides a braking force and an optional third mode allows the stepper motor to serve as a parking brake.

12 Claims, 1 Drawing Sheet

US 6,812,663 B2

ELECTRIC DRIVE SYSTEM INCLUDING A STEPPER MOTOR

BACKGROUND OF THE INVENTION

This invention generally relates to electric drive systems for vehicle components. More particularly, this invention relates to a system including a stepper motor that provides driving torque to a selected vehicle component.

Drive systems for vehicles typically include an internal combustion engine that provides driving torque through a transmission to driven wheels on a vehicle. Alternate arrangements have been proposed that include electric motors providing driving torque to driven wheels. In such situations, gear reduction assemblies have been required between the motors and the driven wheels because of the difference in rotational speeds required. Electric motors typically need to rotate at very high speeds to achieve the desired horsepower or torque necessary to drive the vehicle wheels. The wheels need to rotate at much lower speeds than the rotating components of the electric motors. Gear reduction assemblies, such as planetary gear arrangements, have been inserted between the electric motors and the driven wheels to provide the necessary gear reduction ratio so that the wheels are driven at the appropriate speed with the desired amount of torque.

Such arrangements, while having proven useful in some situations, are not without drawbacks and shortcomings. One major drawback associated with such arrangements is that the gear reduction assemblies introduce additional complexity, material cost, and weight to the vehicle. Further, it is often difficult to incorporate such arrangements within the typical packaging constraints of a vehicle. Modifying the vehicle chassis or other conventional vehicle components has proven prohibitively expensive for incorporating many proposed electric drive systems.

There is a need for improved arrangements where electric power can be used to provide driving torque without the difficulties of accommodating the additional gear reduction assemblies that have been commonly proposed. This invention addresses that need by providing a unique, electrically powered driving arrangement incorporating an electric motor that can be directly coupled to a driven member.

SUMMARY OF THE INVENTION

In general terms, this invention is an assembly that includes a stepper motor that provides driving torque directly to a selected driven member. No gear reduction is required between the motor output and the driven member and, therefore, the inventive arrangement can be much more readily incorporated onto a vehicle within typical packaging constraints. Additionally, eliminating the need for the additional gear reduction assembly provides cost savings and other system economies.

An example assembly designed according to this invention includes a wheel mounting member. A rotatable member is associated with the mounting member to rotate with the wheel. A stepper motor has a rotor and a stator. An output of the rotor is directly coupled to the rotatable member such that rotation of the rotor relative to the stator provides driving torque to the wheel.

With the inventive arrangement, the stepper motor can be operated in a first mode to provide driving torque to the wheel. The stepper motor can also be operated in a second mode where the motor applies a braking force to resist rotation of the wheel.

In one example embodiment, the stepper motor also functions as a parking brake when the motor is selectively powered to provide a parking brake function.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
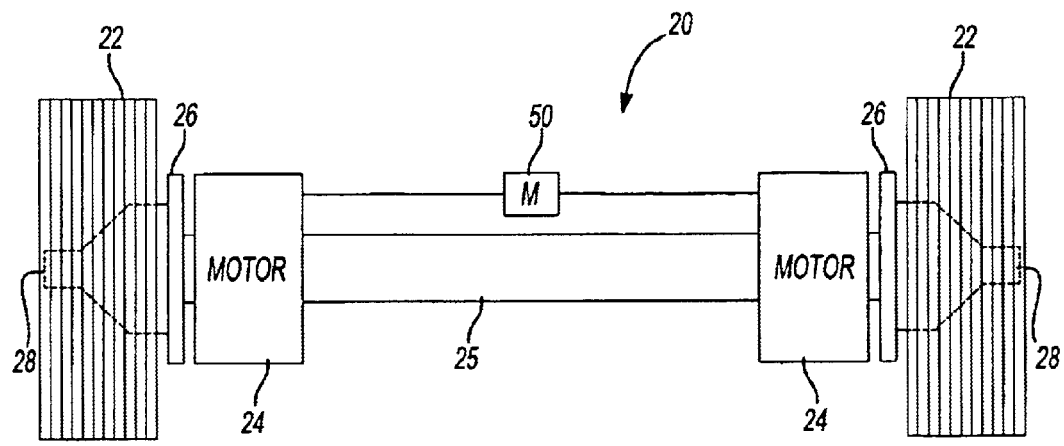
FIG. 1 schematically illustrates a drive assembly designed according to this invention.

FIG. 1 schematically illustrates a drive arrangement 20 for providing driving torque to driven wheels 22 of a vehicle. A stepper motor 24 is associated with each wheel 22 to provide driving torque to the wheels as needed to cause the vehicle to move in a desired direction at a desired speed. Although the example of FIG. 1 shows the motors 24 supported on an axle housing 25, this invention is not limited to such an arrangement.

The output of each stepper motor 24 is directly coupled with a rotatable member 26 that is associated with a wheel mounting member 28 (i.e., a spindle).

A significant advantage to the inventive arrangement is that the output of each stepper motor 24 is directly coupled with the rotatable member 26 so that as the output of the stepper motors rotates, the corresponding wheel 22 rotates. According to a preferred embodiment this is possible, at least in part, because of the large diameter of the motor and the high current pulses driving the motor. The inventive arrangement eliminates the need for gear reduction assemblies between the motors 24 and the driven wheels 22. This presents a significant departure from the prior art where electric motors, which typically have components that rotate at very high speeds to achieve the driving torque necessary to drive a wheel, have required gear reduction assemblies between the motor output and the driven wheels. The inventive arrangement is much more easily accommodated within the typical packaging constraints of a vehicle.

Figure 2:
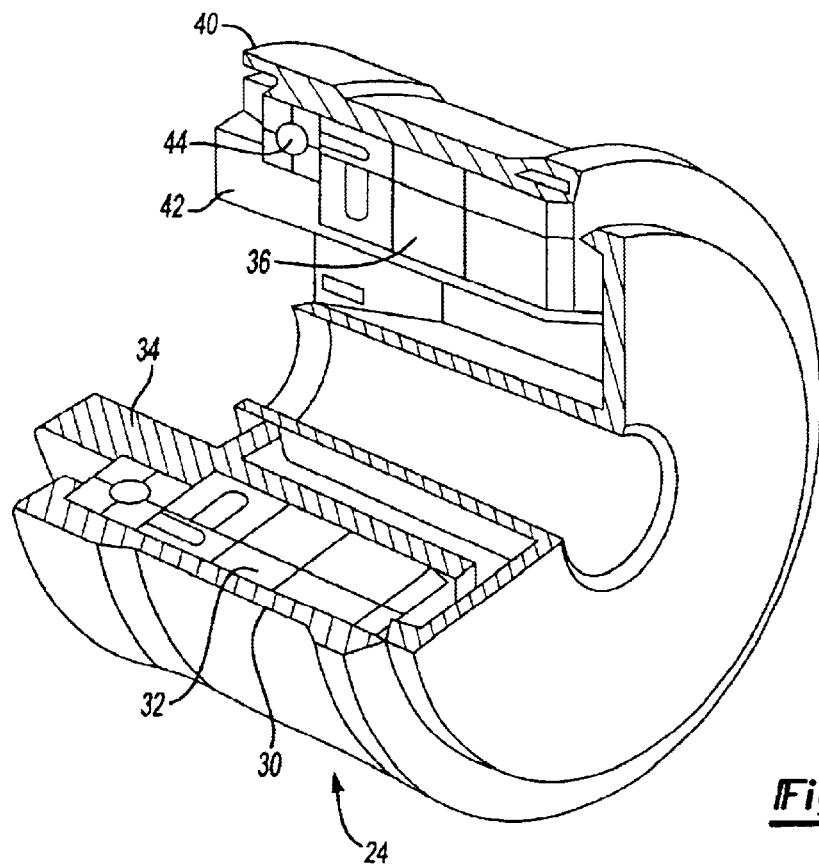
FIG. 2 schematically illustrates, in partial cut away view, an example stepper motor that is useful with a system designed according to this invention.

As best appreciated from FIG. 2, the stepper motors 24 include a rotor 30 having a housing and a core 32. A stator 34 has a housing and a core 36. The example arrangement has the stator 34 on the inside of the motor and the rotor 30 on the outside. With such an example stepper motor, a surface 40 of the rotor housing is adapted to be directly coupled to the rotatable member 26 associated with the wheel mounting member 28. There is no gear reduction assembly between the output of the motor 24 and the driven wheel 22. A variety of mechanical couplings can be used and those skilled in the art who have the benefit of this description will realize what works best for their particular application.

The illustrated example preferably accommodates the stator 34 being secured to the axle housing 25 so that the stator remains stationary and the rotor 30 rotates relative to the stator and the axle housing 25. A conventional bearing arrangement 44 facilitates the relative rotation between the motor components. A portion of the stator housing 42 facilitates the connection with the axle housing 25.

In one example, the stepper motor 24 comprises a multiphase, high pulse current stepper motor. Such a stepper motor is capable of producing the desired amount of torque at rotational speeds that are suitable for directly driving the driven wheels 22. A controller 50 preferably is programmed to power the stepper motor to achieve the desired driving torque at the wheels. The controller 50 may be incorporated as part of a controller already on board the vehicle, or may be a dedicated microprocessor, for example. Those skilled in the art who have the benefit of this description will be able to develop the necessary programming to have the controller 50 operate in a manner consistent with this invention.

The torque levels needed at the vehicle wheels will depend on the particular vehicle application. For heavy vehicles (i.e., trucks) relatively large stepper motors will be required to achieve the desired torque levels. Outside dimensions of the rotor on the order of 17 inches will likely be useful in many such applications. Accordingly, for heavy vehicles, a stepper motor in an assembly that is designed according to this invention may have an outside dimension in the range from about 15 inches to about 20 inches. Choosing the specific size and dimensions of the stepper motor will depend on the particular configuration of the axle assembly or the particular location of the driven wheels on the vehicle. Those skilled in the art who have the benefit of this description will be able to select appropriate component sizes to achieve the torque needed for a particular vehicle and to accommodate the inventive arrangement within typical vehicle packaging constraints.

The stepper motors 24 preferably operate in a first mode to provide driving torque to the wheels 22. The controller 50 controls the current supply, for example, to the windings within the motors to achieve the desired rotation and driving torque. Powering the stepper motors in this mode can be accomplished in a conventional manner. It is known how to power a stepper motor to achieve a desired rotation rate and torque level.

The stepper motors 24 in the inventive arrangement preferably also operate in a regenerative mode during coasting or vehicle braking. In this mode, the motors preferably are used as generators to generate current for charging a power supply (not illustrated) that is used to power the motors and perhaps other electrical components on a vehicle.

The stepper motors 24 preferably also operate in a braking mode where the motors themselves perform a braking function. By appropriately powering the motors 24, the stator and rotor components can be controlled to resist relative rotation between them. Using the stepper motors in this manner, resists rotation of the wheels 22 because of the direct coupling between the rotor 30 and the rotatable member 26. Accordingly, the stepper motors 24 not only provide driving torque, but also provide a braking function to assist a mechanical brake. In another example, the stepper motors 24 are the only brake for a selected set of driven wheels 22.

In one example, the stepper motors 24 perform a parking brake function where the controller 50 provides a reduced current level to the stepper motors 24 in a known manner to maintain the position of the rotor 30 relative to the stator 34 so that the motor is effectively in a locked position.

This invention utilizes a stepper motor in a unique manner to provide driving torque, braking force, or both to vehicle wheels. Previous to this invention, stepper motors had been used for such applications as computer printers, robotic actuators, and similar devices. Prior to this invention no one had implemented a stepper motor in a way that provides driving torque directly to a vehicle wheel from an electric motor without requiring a gear reduction assembly between the motor output and the wheel.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A drive assembly for providing driving torque to a vehicle wheel, comprising:

a wheel mounting member;

a rotatable member that is associated with the wheel mounting member to rotate with the vehicle wheel; and a stepper motor having a rotor and a stator, an output of the rotor being directly connected to the rotatable member such that rotation of the rotor relative to the stator provides driving torque to the vehicle wheel.

2. The assembly of claim 1, wherein the stepper motor comprises a multiphase, high pulse current stepper motor.

3. The assembly of claim 1, wherein the rotor generally surrounds the stator.

4. The assembly of claim 1, including a controller that controls current supplied to the stepper motor and wherein the controller controls current supplied in a first mode to provide driving torque to the vehicle wheel and in a second mode to provide a braking force to resist rotation of the vehicle wheel.

5. The assembly of claim 4, wherein the controller provides current in a third mode such that the stepper motor is operative as a parking brake.

6. The assembly of claim 1, wherein the stepper motor operates in a first mode to provide the driving torque and in a second mode to provide a braking force to resist rotation of the vehicle wheel.

7. The assembly of claim 1, wherein the rotor has an outside dimension in the range from about 15 inches to about 20 inches.

8. A drive assembly for providing driving torque to a vehicle wheel, comprising:

a wheel mounting member;

a rotatable member that is associated with the wheel mounting member to rotate at the same speed as the vehicle wheel; and a stepper motor having a rotor directly connected to the rotatable member such that rotation of the rotor provides drive torque to the vehicle wheel when the stepper motor operates in a first mode and the stepper motor operates in a second mode where the stepper motor applies a braking force to resist rotation of the vehicle wheel.

9. The assembly of claim 8, wherein the stepper motor comprises a multiphase, high pulse current stepper motor.

10. The assembly of claim 8, wherein the rotor has an outside dimension that is in the range from about 15 inches to about 20 inches.

11. The assembly of claim 8, including a controller that controls current supplied to the stepper motor to cause the stepper motor to selectively operate in either the first mode or the second mode.

12. The assembly of claim 11, wherein the controller provides current to the stepper motor in a third mode such that the stepper motor is selectively operative as a parking brake.

* * * * *